United States Patent [19]

Ahrweiler

[11] 4,280,262
[45] Jul. 28, 1981

[54] HYDRAULICALLY CONTROLLED VARIABLE DEFLECTION ROLL

[75] Inventor: Karl-Heinz Ahrweiler, Krefeld, Fed. Rep. of Germany

[73] Assignee: Eduard Küsters, Krefeld, Fed. Rep. of Germany

[21] Appl. No.: 81,475

[22] Filed: Oct. 3, 1979

[30] Foreign Application Priority Data

Feb. 14, 1979 [DE] Fed. Rep. of Germany ....... 2905488

[51] Int. Cl.³ ............................................. B21B 31/32
[52] U.S. Cl. ................................. 29/116 AD; 100/170
[58] Field of Search ...... 29/116 AD, 113 AD, 116 R; 100/170; 308/20, 208

[56] References Cited

U.S. PATENT DOCUMENTS

| 3,131,625 | 5/1964 | Kusters et al. | 29/116 AD X |
| 3,638,292 | 2/1972 | Gaghan | 29/116 AD X |

Primary Examiner—Peter P. Nerbun
Attorney, Agent, or Firm—Kenyon & Kenyon

[57] ABSTRACT

An hydraulically controlled variable deflection roll of the type applying the deflection force between the fixed shaft and the rotative shell via piston and cylinder arrangements, as to each of the arrangements uses a large number of pistons of smaller diameter.

5 Claims, 3 Drawing Figures

HYDRAULICALLY CONTROLLED VARIABLE DEFLECTION ROLL

BACKGROUND OF THE INVENTION

One kind of hydraulically controlled variable deflection roll is disclosed by the 1964 Kusters et al U.S. Pat. No. 3,131,625.

This roll comprises a rotative shell forming an external work-rolling surface and a cylindrical inside. A fixed shaft extends through the shell's inside with radial clearance permitting independent transverse deflection of the roll and shaft. The shaft has a longitudinally extending series of radially extending cylinders formed by blind bores in the shaft. Each cylinder contains a single reciprocating piston for applying the roll deflection force between the shaft and the shell via a bearing shoe bearing on the shell's cylindrical inside.

When in use with the roll rotating against a counter-roll to form a nip through which flat work can be rolled, hydraulic pressure is introduced uniformly to the cylinders so their pistons force the shoes against the shell's inside to control the shell's contour. The reaction is carried by the shaft which functions as a beam and consequently bends under the beam stress it receives, whether the roll's controlled contour is straight or curved.

Excepting for the cylindrical bores and relatively small hydraulic liquid feed passages to the various cylinders, the fixed shaft is made of solid metal. Its maximum diameter is limited by the need for clearance between it and the shell's inside. The radial extent or depth of the bores affect the beam strength and stiffness of the shaft, so it is desirable to have the bores as short or shallow as possible. It has been necessary to make the cylinders formed by the bores, and their pistons, of large diameter to provide adequate roll deflection force without using excessive hydraulic pressure. It is common rule that to avoid a piston tilting or canting in its cylinder, the piston must have a guided length 1.5 times its diameter, necessarily requiring its cylinder to be substantially longer to accommodate the piston's working stroke. It follows that in the case of the described roll the bores forming the cylinders must extend undesirably far into the fixed shaft in its radial direction with a consequent undesirable reduction in the shaft's beam strength and stiffness.

Therefore, the development of the described kind of controlled variable deflection roll has presented an engineering problem.

SUMMARY OF THE INVENTION

The present invention provides a solution to the above problem. Only relatively shallow recesses are needed in the fixed shaft. These face the shell's cylindrical inside, each recess having a plate spaced radially from its inside end and thereby forming a manifold space behind the plate, and it is to this space that the hydraulic pressure is introduced. The plate has extending through it a multiplicity of cylindrical holes with the plate having a thickness providing these holes each with a length that is at least 1.5 times its diameter. Each of these holes, open at both ends, has a piston extending through it with the piston's inner end projecting in the space to which the hydraulic pressure is introduced and its outer end projecting towards the shell's inside. It is via the outer ends of these pistons that the bearing shoe receives the roll shell deflection force, this being from the group of pistons which act collectively when the hydraulic pressure is introduced to the space behind the plate. This arrangement with its multiplicity of what might be called pin pistons replaces each of the large diameter piston and cylinder arrangements described before.

With this new arrangement substantially or almost the same roll deflection force can be obtained from substantially the same hydraulic pressure as can be obtained by the single piston and cylindrical arrangement, but because of their small diameter the guided length of the pin pistons can be made substantially shorter. The recesses required to contain the pin piston groups can be made substantially shallower or of less radial depth than before with a consequent effective increase in the beam strength and stiffness of the fixed shaft.

DESCRIPTION OF THE DRAWINGS

A specific example of this invention is somewhat schematically illustrated by the accompanying drawings in which.

DETAILED DESCRIPTION OF THE INVENTION

Referring to the above drawings, the illustrated hydraulically controlled variable deflection roll 10 is shown in cross section with its fixed shaft 1 extending through the cylindrical inside of the shell 2 having the external rolling surface. The clearance or radial spacing between the shaft and roll is marked S, possibly exaggerated in extent in FIG. 1, but in any event being adequate to permit independent transverse bending of the shell and shaft. A blind bore 3 is shown in the shaft with the understanding that a description of only this one and its parts involved is adequate because the balance of the parts forming a series extending longitudinally of the shaft are all the same.

Figure 1:
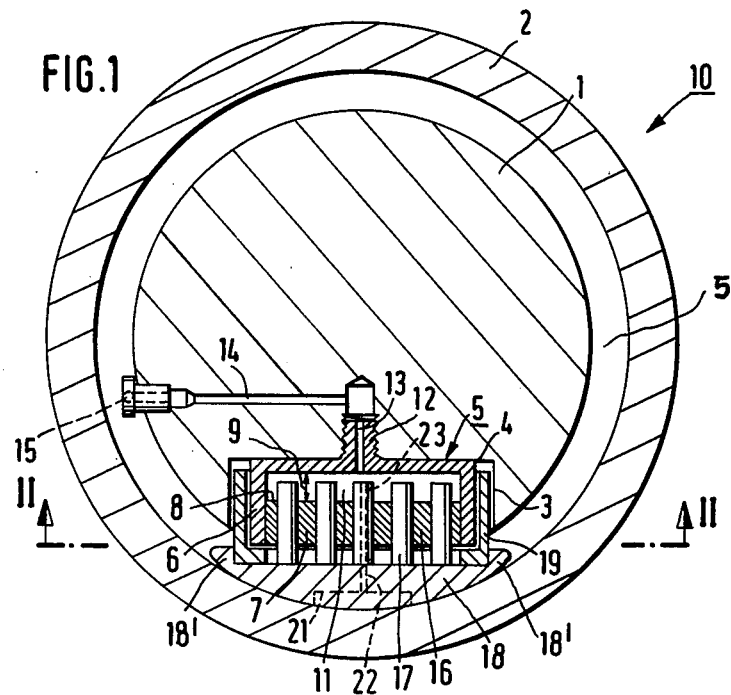
FIG. 1 is a cross section taken through the variable deflection roll.

This bore 3 has a flat inner end 4 and the bore, as can be seen from FIG. 1, need not extend radially into the solid metal of the shaft 1 nearly so far as is indicated by the previously mentioned Kusters et al patent where each bore forms a cylinder of large diameter containing a single large piston.

A closed cylindrical pressure unit 5 is positioned in the bore 3. This unit comprises a metal housing that is an inverted cup-shape and has a flat top or inner end butting against the flat end 4 of the bore 3, the housing having a cylindrical depending wall 6 in which a metal plate 7 is fixed fluid tightly so that the inner or top surface 8 of the plate is spaced a distance 9 below the bottom of the top of the housing 5. The result is a space 11 which is fluid tight. The inner end of the housing 5 has an upwardly extending nipple 12 which is screwed into a threaded hole formed in the shaft 1 concentric with the cylindrical bore 3, thus fixing the housing 5 removably but firmly in the recess 3. This nipple has a passage 13 which via a passage 14 drilled transversely in the shaft 1 leads to a passage 15 formed by a tube (not shown) which extends longitudinally along the shaft 1 and out from its end for connection with a source of hydraulic pressure (not shown).

The plate 7 is formed with a multiplicity of cylindrical holes 16 forming a cluster of holes or cylinders and in each of these holes a cylindrical piston 17 is positioned. The pistons 17 are of small diameter relative to their length and the latter is long enough so that the upper or inner ends of the pistons extend into the space 11 while their lower ends project outwardly beyond the bottom or outside of the plate 7. The space 11, acting as a manifold, when fed with hydraulic pressure, applies this pressure to the inwardly extending ends of all of the pistons and so to their outer ends which press on the top of the bearing shoe 18 which bears against the cylindrical inside of the shell 2.

Because of the small diameter of the cylindrical holes or cylinders 16, the plate 7 can be made thick enough to provide the holes or cylinders with lengths that are at least 1.5 times their diameters so that the pistons, which can aptly be called pin pistons, can be guided in a manner preventing them from canting or tilting with its consequent possible jamming action. Because of the small diameters, the plate 7 need not be very thick in the radial direction of the shaft. The housing 5 need be only thick enough to safely contain the hydraulic pressure in the space 11. The guided piston lengths can, in fact, be made much longer than necessary while still providing for the necessary stroke length of the pistons required to control or vary the deflection of the shell 2 under service conditions, and while permitting the unit 5 to be made short in the roll's radial direction.

As usual, the illustrated roll is used against a counter-roll (not shown), which can be of the same construction, to form a nip through which flat work is rolled, as for example, to calender cloth or paper webs. The rolling pressure is carried by the shaft 1 which functions as a beam providing the reaction to the pressure the various shoes 18 exert against the inside of the shell 2.

For deflection control, the hydraulic pressure introduced to the space 11 is cumulatively distributed uniformly over the inner ends of all of the pin pistons which moving outwardly exert the deflection controlling pressure via the shoes 18, it being understood that the orientation is such that the pressure is applied against the side of the shell 2 contacting the counterroll.

The space S can be fed with a liquid lubricant and each shoe 18 is chamfered at its circumferential ends as at 18′ so that the shoe can float on a lubricating film. In addition or in the alternate, the shoe 18 may be designed as a hydrostatic shoe, this being done by forming the shoe with a central pocket 21 fed with lubricant via a passage 22 in the shoe and a passage 23 in a registering pin piston, via the pressurized liquid, normally oil-like, providing the hydraulic pressure in the space 11.

The cylindrical side wall 6 of the housing 5 is of smaller diameter than the cylindrical wall of the bore 3 so that beam deflection of the shaft 1 which might alter the otherwise cylindrical contour of the bore 3, has no effect on the housing 5. The housing 5 with its cylindrical wall 6, plate 7 and pin pistons 17, forms an integrated self-contained unit which can be removed for inspection and servicing during normal servicing of the roll when the shaft 1 and shell 2 are separated from each other.

The shell rotation applies some drag to the shoe 18 tending to move it in the direction of the roll's rotation. This applies a small bending force to the pin pistons, and to prevent excessive strain on the pistons, the shoe 18 is formed to provide a socket in which is fitted an upstanding cylindrical wall 19 which extends up into the clearance between the housing's wall 6 and the side of the bore 3. This clearance or space should be of such a radial extent as to permit the upstanding wall 19 or guide means to extend upwardly while still leaving clearance between it and the housing's wall 6 and bore wall 3, for the reason previously explained.

Figure 2:
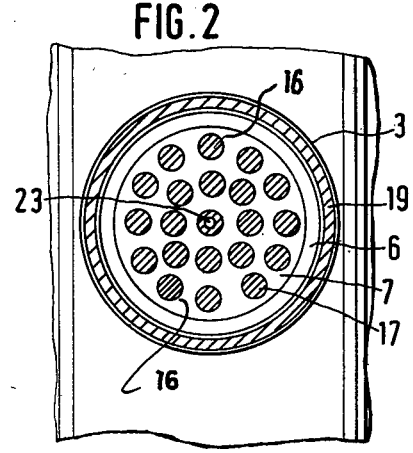
FIG. 2 is a longitudinal section taken on the line II—II in FIG. 1.
Figure 3:
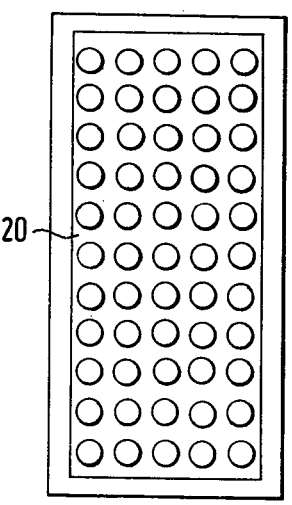
FIG. 3 shows a possible modification of FIG. 2.

FIG. 3 is provided to show that the parts described can have a rectangular shape. The circular or cylindrical contour of FIGS. 1 and 2 have advantages from the viewpoint of boring the shaft, etc.

By this invention each of the big pistons of the prior art proposal is, in effect, dissolved into a larger number of small pin pistons. To provide a piston guiding length of at least 1.5 times the piston diameter, the prior art requires the fixed shaft to be radially bored undesirably deeply. With this invention and its pin pistons of comparatively very small diameter, the required guiding length can be provided by what are, in effect, cylinders 16 of relatively very small axial extent and, therefore, requiring the shaft to be bored to a much lesser depth with consequent retention of much more of the shaft's beam strength.

What is claimed is:

1. A hydraulically controlled variable deflection roll comprising a rotative shell having an external work-rolling surface and a cylindrical inside, a fixed shaft extending through said inside with radial clearance permitting independent transverse bending of the shell and shaft, said shaft having at least one radial recess facing said inside, a plate spaced radially from the inside end of said recess and forming therewith a manifold space between the plate and said end, means for introducing hydraulic pressure to said space, said plate having extending therethrough a multiplicity of cylindrical holes each having a piston extending therethrough with an inner end in said space and an outer end projecting towards the shell's said inside, and a bearing shoe having an outer surface bearing on the shell's said inside and an inner surface to which all of the pistons' said outer ends collectively apply force when hydraulic pressure is introduced to said space by said means.

2. The roll of claim 1 in which a housing forms said recess and said plate is fixed to said housing and therewith forms a closed unit, said shaft integrally forming a radial recess in which said unit is fixed.

3. The roll of claim 3 in which there is space between the side of said housing and the side of the shaft's said radial recess.

4. The roll of claim 3 in which guide means extend from said shoe into said space between the housing's said side and said side of the shaft's said recess and with clearance therebetween.

5. The roll of any one of claims 1–4 in which said holes each have a length at least 1.5 times their diameter.

* * * * *